(12) United States Patent
Fornage et al.

(10) Patent No.: US 8,963,378 B1
(45) Date of Patent: Feb. 24, 2015

(54) METHOD AND APPARATUS FOR INTERCONNECTING DISTRIBUTED POWER SOURCES

(75) Inventors: Martin Fornage, Petaluma, CA (US); Raghuveer R. Belur, Los Altos Hills, CA (US)

(73) Assignee: Enphase Energy, Inc., Petaluma, CA (US)

(*) Notice: Subject to any disclaimer, the term of this patent is extended or adjusted under 35 U.S.C. 154(b) by 139 days.

(21) Appl. No.: 13/597,718

(22) Filed: Aug. 29, 2012

Related U.S. Application Data

(63) Continuation of application No. 12/931,081, filed on Jan. 24, 2011, now Pat. No. 8,257,106.

(60) Provisional application No. 61/298,074, filed on Jan. 25, 2010.

(51) Int. Cl.
| | | |
|---|---|---|
| *H01R 25/00* | (2006.01) | |
| *H01R 4/00* | (2006.01) | |
| *H01R 3/00* | (2006.01) | |
| *H02J 3/38* | (2006.01) | |

(52) U.S. Cl.
USPC ............... 307/147; 307/43; 307/82; 307/84; 439/121

(58) Field of Classification Search
USPC ......... 439/121, 357, 352, 498, 504, 579, 582, 439/624, 404, 417, 419, 715, 699.2; 362/391, 806, 249, 226, 241; 174/84 C; 307/147, 43, 82, 84
See application file for complete search history.

(56) References Cited

U.S. PATENT DOCUMENTS

| | | | |
|---|---|---|---|
| 1,767,262 | A | 6/1930 | Schmitz |
| 3,920,306 | A | 11/1975 | Barnett et al. |
| 4,114,048 | A | 9/1978 | Hull et al. |
| 4,217,633 | A | 8/1980 | Evans, Jr. |
| 4,255,007 | A | 3/1981 | Michaels et al. |
| 4,857,826 | A | 8/1989 | Graham |
| 4,917,632 | A | 4/1990 | Smith |
| 4,971,576 | A | 11/1990 | Thimmesch |
| 5,069,634 | A | 12/1991 | Chiarolanzio |

(Continued)

FOREIGN PATENT DOCUMENTS

| | | |
|---|---|---|
| EP | 1 575 136 A2 | 9/2005 |
| EP | 1837985 | 9/2007 |

(Continued)

OTHER PUBLICATIONS

Weidong Xiao, Nathan Ozog and William G. Dunford, "Topology Study of Photovoltaic Interface for Maximum Power Point Tracking," IEEE Transactions on Industrial Electronics, vol. 54, No. 3, Jun. 2007, pp. 1696-1704.

(Continued)

*Primary Examiner* — Renee S Luebke
*Assistant Examiner* — Harshad Patel
(74) *Attorney, Agent, or Firm* — Moser Taboada

(57) ABSTRACT

A method and apparatus for power wiring. In one embodiment, the apparatus comprises a splice box comprising (i) a plug having a plurality of plug pins, each plug pin of the plurality of plug pins for coupling to a conductor within a cable adapted for coupling to a power line; (ii) a first pin receptacle for coupling to a first guide pin of a connector; and (iii) a first pair of retention bars disposed within the first pin receptacle, the first pair of retention bars for retaining the first guide pin.

6 Claims, 13 Drawing Sheets

(56) References Cited

U.S. PATENT DOCUMENTS

| | | | |
|---|---|---|---|
| 5,191,519 A | 3/1993 | Kawakami | |
| 5,446,241 A | 8/1995 | Mackaness et al. | |
| 5,473,528 A | 12/1995 | Hirata et al. | |
| 5,745,356 A | 4/1998 | Tassitino et al. | |
| 5,833,495 A | 11/1998 | Ito | |
| 5,855,494 A | 1/1999 | Blaszczyk et al. | |
| 5,864,094 A | 1/1999 | Griffin | |
| 5,886,890 A | 3/1999 | Ishida et al. | |
| 5,951,785 A | 9/1999 | Uchihashi et al. | |
| 5,964,620 A | 10/1999 | Takahashi et al. | |
| 6,046,400 A | 4/2000 | Drummer | |
| 6,050,840 A | 4/2000 | Kowalski et al. | |
| 6,074,238 A * | 6/2000 | DeRoss et al. | 439/409 |
| 6,074,244 A | 6/2000 | Crum et al. | |
| 6,111,189 A | 8/2000 | Garvison et al. | |
| 6,163,958 A * | 12/2000 | Suzuki | 29/866 |
| 6,180,868 B1 | 1/2001 | Yoshino et al. | |
| 6,201,180 B1 | 3/2001 | Meyer et al. | |
| 6,227,914 B1 | 5/2001 | Lee et al. | |
| D445,090 S | 7/2001 | Payne et al. | |
| 6,268,559 B1 | 7/2001 | Yamawaki | |
| 6,285,572 B1 | 9/2001 | Onizuka et al. | |
| 6,291,764 B1 | 9/2001 | Ishida et al. | |
| 6,356,471 B1 | 3/2002 | Fang | |
| 6,381,157 B2 | 4/2002 | Jensen | |
| 6,396,170 B1 | 5/2002 | Laufenberg et al. | |
| 6,422,891 B1 | 7/2002 | Huang | |
| D472,523 S | 4/2003 | Hansen | |
| 6,592,395 B2 | 7/2003 | Brown et al. | |
| 6,593,521 B2 | 7/2003 | Kobayashi | |
| 6,605,881 B2 | 8/2003 | Takehara et al. | |
| 6,713,890 B2 | 3/2004 | Kondo et al. | |
| 6,737,762 B2 | 5/2004 | Koenig | |
| 6,750,391 B2 | 6/2004 | Bower et al. | |
| 6,791,024 B2 | 9/2004 | Toyomura | |
| 6,838,611 B2 | 1/2005 | Kondo et al. | |
| 6,897,370 B2 | 5/2005 | Kondo et al. | |
| D511,747 S | 11/2005 | Rey et al. | |
| 7,018,230 B2 | 3/2006 | Shimirak | |
| 7,042,110 B2 | 5/2006 | Mikhail et al. | |
| 7,070,443 B2 | 7/2006 | Tashiro et al. | |
| 7,072,195 B2 | 7/2006 | Xu | |
| D527,346 S | 8/2006 | Brodin | |
| 7,248,490 B2 | 7/2007 | Olsen et al. | |
| 7,297,866 B2 | 11/2007 | Aschenbrenner | |
| D559,785 S | 1/2008 | Tosetti | |
| 7,342,171 B2 | 3/2008 | Khouri et al. | |
| 7,387,537 B1 | 6/2008 | Daily et al. | |
| 7,405,494 B2 | 7/2008 | Tassitino et al. | |
| 7,405,652 B2 | 7/2008 | Hair, III et al. | |
| 7,456,523 B2 | 11/2008 | Kobayashi | |
| D585,837 S | 2/2009 | Kuehne et al. | |
| D599,741 S | 9/2009 | Meldert et al. | |
| 7,638,899 B2 | 12/2009 | Tracy et al. | |
| 7,646,109 B2 | 1/2010 | Belady et al. | |
| 7,839,022 B2 | 11/2010 | Wolfs | |
| 7,855,473 B2 | 12/2010 | Fornage | |
| 7,874,860 B2 | 1/2011 | Starke et al. | |
| 7,893,346 B2 | 2/2011 | Nachamkin et al. | |
| 7,899,632 B2 | 3/2011 | Fornage et al. | |
| 8,207,637 B2 * | 6/2012 | Marroquin et al. | 307/147 |
| 8,227,942 B2 | 7/2012 | Marroquin et al. | |
| 2003/0111103 A1 | 6/2003 | Bower et al. | |
| 2005/0032416 A1 | 2/2005 | Peress et al. | |
| 2005/0090132 A1 | 4/2005 | Miyazaki | |
| 2005/0207197 A1 | 9/2005 | Chou et al. | |
| 2005/0213272 A1 | 9/2005 | Kobayashi | |
| 2005/0226164 A1 | 10/2005 | Williams | |
| 2005/0281064 A1 | 12/2005 | Olsen et al. | |
| 2006/0083039 A1 | 4/2006 | Oliveira et al. | |
| 2007/0188130 A1 | 8/2007 | Scheucher | |
| 2007/0221267 A1 | 9/2007 | Fornage | |
| 2007/0252716 A1 | 11/2007 | Burger | |
| 2007/0295392 A1 | 12/2007 | Cinnamon | |
| 2007/0295393 A1 | 12/2007 | Cinnamon | |
| 2008/0078436 A1 | 4/2008 | Nachamkin et al. | |
| 2008/0095646 A1 | 4/2008 | Nishii et al. | |
| 2008/0194137 A1 | 8/2008 | Kuo | |
| 2008/0283118 A1 | 11/2008 | Rotzoll et al. | |
| 2009/0000654 A1 | 1/2009 | Rotzoll et al. | |
| 2009/0020151 A1 | 1/2009 | Fornage | |
| 2009/0047818 A1 | 2/2009 | Irwin et al. | |
| 2009/0084426 A1 | 4/2009 | Fornage et al. | |
| 2009/0147554 A1 | 6/2009 | Adest et al. | |
| 2009/0200994 A1 | 8/2009 | Fornage | |
| 2009/0242272 A1 | 10/2009 | Little et al. | |
| 2009/0296348 A1 | 12/2009 | Russell et al. | |
| 2010/0138061 A1 | 6/2010 | Walling et al. | |
| 2010/0139945 A1 | 6/2010 | Dargatz | |
| 2010/0175338 A1 | 7/2010 | Garcia Cors | |
| 2010/0181830 A1 | 7/2010 | Fornage et al. | |
| 2010/0195357 A1 | 8/2010 | Fornage et al. | |
| 2010/0263704 A1 | 10/2010 | Fornage et al. | |
| 2010/0283325 A1 | 11/2010 | Marcianesi et al. | |
| 2010/0309695 A1 | 12/2010 | Fornage | |
| 2011/0012429 A1 | 1/2011 | Fornage | |
| 2011/0012430 A1 | 1/2011 | Cheng et al. | |
| 2011/0018353 A1 | 1/2011 | Yu | |
| 2011/0019444 A1 | 1/2011 | Dargatz et al. | |
| 2011/0084556 A1 | 4/2011 | Marroquin et al. | |
| 2011/0115301 A1 | 5/2011 | Bhavaraju et al. | |
| 2011/0168228 A1 | 7/2011 | McGreevy et al. | |
| 2011/0183537 A1 | 7/2011 | Fornage et al. | |

FOREIGN PATENT DOCUMENTS

| | | |
|---|---|---|
| JP | 08-264209 | 10/1996 |
| JP | 09-154220 | 6/1997 |
| JP | 2007-059259 | 3/2007 |

OTHER PUBLICATIONS

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 11, 2008.

"IEEE Standard for Interconnecting Distributed Resources with Electric Power Systems," IEEE Standard 1547TM-2003, IEEE, Jul. 28, 2003.

Non-Final Office Action dated Mar. 15, 2010 for U.S. Appl. No. 12/075,342 entitled "Apparatus for Phase Rotation for a Three-Phase AC Circuit", 6 pages.

Final Office Action dated Jul. 19, 2010 for U.S. Appl. No. 12/075,342 entitled "Apparatus for Phase Rotation for A Three-Phase AC Circuit", 9 pages.

NEC 2008—ANSI/NFPA 70 National Electrical Code, 4 pages.

UL 94 "Test for Flammability of Plastic Materials for Parts in Devices and Appliances", Underwriters Laboratories, Inc. (UL), Northbrook, IL, Jul. 10, 1998, 43 pages.

UL 1977 "Component Connectors for Use in Data, Signal, Control and Power Applications", Underwriters Laboratories, Inc. (UL), Northbrook, IL, Oct. 18, 2002, 29 pages.

UL 486A "Wire Connectors and Soldering Lugs for Use With Copper Conductors", Underwriters Laboratories, Inc. (UL), Northbrook, IL, May 23, 2001, 57 pages.

UL 498 "Attachment Plugs and Receptacles", Underwriters Laboratories, Inc. (UL), Northbrook, IL, Dec. 26, 2001, 294 pages.

UL 1277 "Electrical Power and Control Tray Cables with Optional Optical-Fiber Members", Underwriters Laboratories, Inc. (UL), Northbrook, IL, Nov. 14, 2001, 48 pages.

ANSI/IEC 60529-2004, "Degrees of Protection Provided by Enclosures (IP Code)", National Electrical Manufacturers Association, 2004, 16 pages.

IEC 61215, "Crystalline Silicon Terrestrial Photovoltaic (PV) Modules—Design Qualification and Type Approval", International Standard, Second Edition, 2005, 8 pages.

IEC 61730-1, "Photovoltaic (PV) Module Safety Qualification", International Standard, Norme Internationale, Edition 1.0, 2004, 11 pages.

(56) References Cited

OTHER PUBLICATIONS

Non-Final Office Action dated Apr. 4, 2011 for U.S. Appl. No. 12/928,685 entitled "Apparatus for Phase Rotation for a Three-Phase AC Circuit", 8 pages.
Final Office Action dated Aug. 8, 2011 for U.S. Appl. No. 12/928,685 entitled "Apparatus for Phase Rotation for a Three-Phase AC Circuit", 10 pages.
IEC 60227-1 Ed. 3.0 B:2007, "Polyvinyl Chloride Insulated Cables of Rated Voltages Up to and Including 450/750 V—Part 1: General requirements", Edition 3.0, Oct. 10, 2007, Abstract downloaded from website: http://www.techstreet.com/standards/iec/60227_1_ed_3_0_b_2007?product_id=1520207 1 page.
IEC 62109-1: "Safety of Power Converters for Use in Photovoltaic Power Systems—Part 1: General Requirements", Apr. 1, 2010, downloaded from website: http://engineers.ihs.com/document/abstract/QDXFRCAAAAAAAAAA 2 pages.
IEC 62109-2: "Safety of Power Converters for Use in Photovoltaic Power Systems—Part 2: Particular Requirements for Inverters", Edition 1.0, 2011, downloaded from website: http://webstore.iec.ch/preview/info_iec62109-2%7Bed1.0%7Db.pdf 16 pages.
UL 514B, ISBN 0-7629-0226-4, "Fittings for Cable and Conduit", Underwriters Laboratories Inc., Northbrook, IL, Feb. 7, 2002, 129 pages.
UL 514C, "Nonmetallic Outlet Boxes, Flush-Device Boxes, and Covers", Underwriters Laboratories Inc., Northbrook, IL, Dec. 11, 2008, 129 pages.
Advisory Action dated Oct. 19, 2011 for U.S. Appl. No. 12/928,685 entitled "Apparatus for Phase Rotation for a Three-Phase AC Circuit", 3 pages.
Enphase Energy, "Application Note: Multi-Tenant Design Guidelines," rev. 1, 5 pages, 2008.
Enphase Energy, "Enphase Field Wiring Diagram—M190 & M210 Microinverters—240v, Single Phase," Drawing No. 144-00001, rev. 6, 1 page, 2009.
Enphase Energy, "Enphase Quick Install Guide," Doc. No. 140-00001, rev. 06, 1 page, 2009.
Power Cords, Hosa Technology, Inc., www.hosatech.com, Aug. 2010, 1 page.
"Power Cord, Piggyback IEC C13 to NEMA 5-15P, 2 ft", Hosa Technology, Inc., www.hosatech.com, Aug. 2010, 1 page.
"Daisy Chain Power Cord Liberator, 12in", CableOrganizer.com, Inc., www.cableorganizer.com, Aug. 2010, 1 page.
"DTCC Connector Division—Geophysical", Dynamic Technologies Co., Ltd., www.dynamictech.biz, Aug. 2010, 4 pages.
DaisyLink System, Electri-Cable Assemblies, Inc., www.electri-cable.com, Aug. 2010, 2 pages.
International Search Report and Written Opinion of the ISA, International Application No. PCT/US2010/048342, Nov. 3, 2010, 12 pages.
Hoffner, et al., "A PV Window Awning System of the University of Texas Houston Health Science Center Using AC-Modules," Photovoltaic Specialists Conference, Conference Record of the Twenty-Eight IEEE, 2000, 1545-1547, Anchorage, AK.
Strong, et al., "Development of Standardized, Low-Cost AC PV Systems—Phase I Annual Report, Sep. 7, 1995-Nov. 7, 1996," National Renewable Energy Laboratory, Jun. 1997.
Strong, S., "The Development of Standardized, Low-Cost AC PV Systems—Final Technical Report, Sep. 8, 1995-Jun. 30, 1998," National Renewable Energy Laboratory, Feb. 1999.
Rodriguez, et al., "Long-Lifetime Power Inverter for Photovoltaic AC Modules," IEEE Transactions on Industrial Electronics, Jul. 7, 2008, 2593-2601, 55-7.
Oldenkamp, et al., "AC Modules: Past, Present, and Future," Workshop Installing the Solar Solution, Jan. 22-23, 1998.
Bower, et al. "Innovative PV Micro-Inverter Topology Eliminates Electrolytic Capacitors for Longer Lifetime," Photovoltaic Energy Conversion, Conference Record of the 2006 IEEE 4th World Conference, 2006, 2038-2041, Waikoloa, HI.
Kern, G., "Sunsine 300: Manufacture of an AC Photovoltaic Module, Final Report, Phases I & II, Jul. 25, 1995-Jun. 30, 1998," National Renewable Energy Laboratory, Mar. 1999.
Russell, et al., "Sunsine 300 AC Module, Annual Report, Jul. 25, 1995-Dec. 31, 1996," National Renewable Energy Laboratory, Aug. 1997.
International Search Report and Written Opinion mailed Sep. 21, 2011 for PCT Application No. PCT/US2011/022251.
Fornage, UL email 2006.
"SolarBridge Technical Overview", SmartSpark Energy Systems Inc., 2007.
Fornage, Meeting Minutes PVI Solutoins email, Apr. 5, 2007.
Balog et al., "Modular Low-Cost Matrix Converter for Solar Grid-Interactive Power", SmartSpark Energy Systems, pp. 1-5, Jun. 15, 2007.
Raghu Belur Notebook excerpt Oct. 9, 2007.
"Enphase Energy Introduces Solar Industry's First Micro-Inverter System", Marketwire, Jun. 10 2008.
Adams response to request for draft drawings and accompanying drawings Oct. 10, 2008.
Correspondence for Quotation from Sourcel Cable, beginning Nov. 4, 2008 and corresponding quotes.
"CBL ASSY. AC TAP 3 DROP", Enphase CAD drawing, Nov. 18, 2008.
Email Correspondence with ISC Engineering, Steve Burk, and Matt Meeker beginning Nov. 19, 2008.
Enphase Purchase Order, Nov. 26, 2008.
Quotation from Tyco Electronics, Dec. 3, 2008.
Balog, Cable matrix email, Dec. 3, 2008.
Zimmerman, "Engineering Requirements Document (ERD) Power Condition Unit AC Cable 360-00012-01", Dec. 8, 2008.
Quotation from Kensington Electronics, Incorporated, Jan. 7, 2009.
Baldassari, "Dually AC Cable Harness Design and Cost Analysis", Jan. 7, 2009.
"Example DC PV Installation", SmarkSpark Energy Systems, Jan. 16, 2009.
"Concept SolarBridge PV/AC Installation", Jan. 16, 2009.
Solarbridge Notebook excerpt Jan. 16, 2009.
"Cable Assy, Male 4 Position", SmartSpark Energy Systems, Inc. CAD drawing, Jan. 21, 2009.
ISC Engineering Invoice, Feb. 6, 2009.
ISC Engineering Invoice, Feb. 16, 2009.
Beck, "Dually Connectors Review", Mar. 23, 2009.
Belur email results of customer feedback conducted Jul. 8, 2009.
Belur D380 Launch Plan, Sep. 2009.
"Mechanical—ACPV microinverter", SolarBridgeTechnolgies, Sep. 15, 2009.
Zimmerman, "M380 AC Cable Assy First Article Test Plan", Sep. 17, 2009.
Chapman et al., "Interconnection Scheme for Alternating Current Photovoltaic Modules", Sep. 21, 2009.
ISC Engineering Shipping Database for Feb. 16, 2009 dated Aug. 13, 2012.
Extended European Search Report for application No. 11735305.2 dated Sep. 24, 2014, 7 pgs.

* cited by examiner

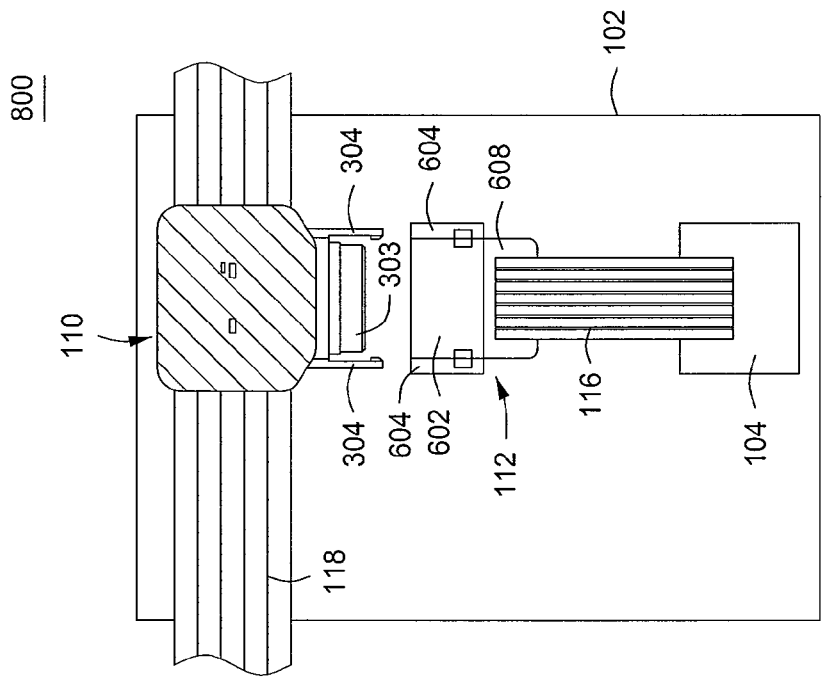
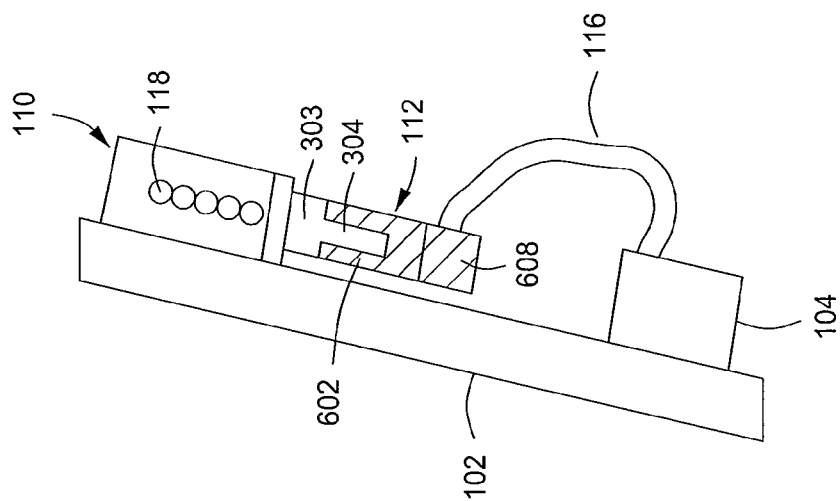
FIG. 8

METHOD AND APPARATUS FOR INTERCONNECTING DISTRIBUTED POWER SOURCES

CROSS-REFERENCE TO RELATED APPLICATIONS

This application is a continuation of pending United States non-provisional patent application Ser. No. 12/931,081 filed Jan. 24, 2011, which further claims the benefit of U.S. provisional patent application Ser. No. 61/298,074, filed Jan. 25, 2010, both of which are herein incorporated by reference in their entirety.

BACKGROUND OF THE INVENTION

Field of the Invention

In one type of photovoltaic energy system, a plurality of photovoltaic (PV) modules are arranged in an array, and each module is coupled to a DC-AC inverter. The output AC energy is collected from each inverter using a daisy chain cable that couples each inverter to each neighboring inverter. The cable is terminated in a junction box to facilitate coupling the AC energy to the power grid. The cable interconnecting the inverters is typically custom made and assembled in the field during installation of the PV module array. Such cable assembly is time-consuming, costly and fraught with error.

Therefore, there is a need in the art for an AC wiring system having a standardized format for interconnecting inverters in a photovoltaic energy system.

SUMMARY OF THE INVENTION

Embodiments of the present invention generally relate to a method and apparatus for power wiring. In one embodiment, the apparatus comprises a splice box comprising (i) a plug having a plurality of plug pins, each plug pin of the plurality of plug pins for coupling to a conductor within a cable adapted for coupling to a power line; (ii) a first pin receptacle for coupling to a first guide pin of a connector; and (iii) a first pair of retention bars disposed within the first pin receptacle, the first pair of retention bars for retaining the first guide pin.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 depicts a side and front perspective view of a splice box, a drop connector and a drop cable in accordance with one or more embodiments of the present invention;

DETAILED DESCRIPTION

Figure 1:
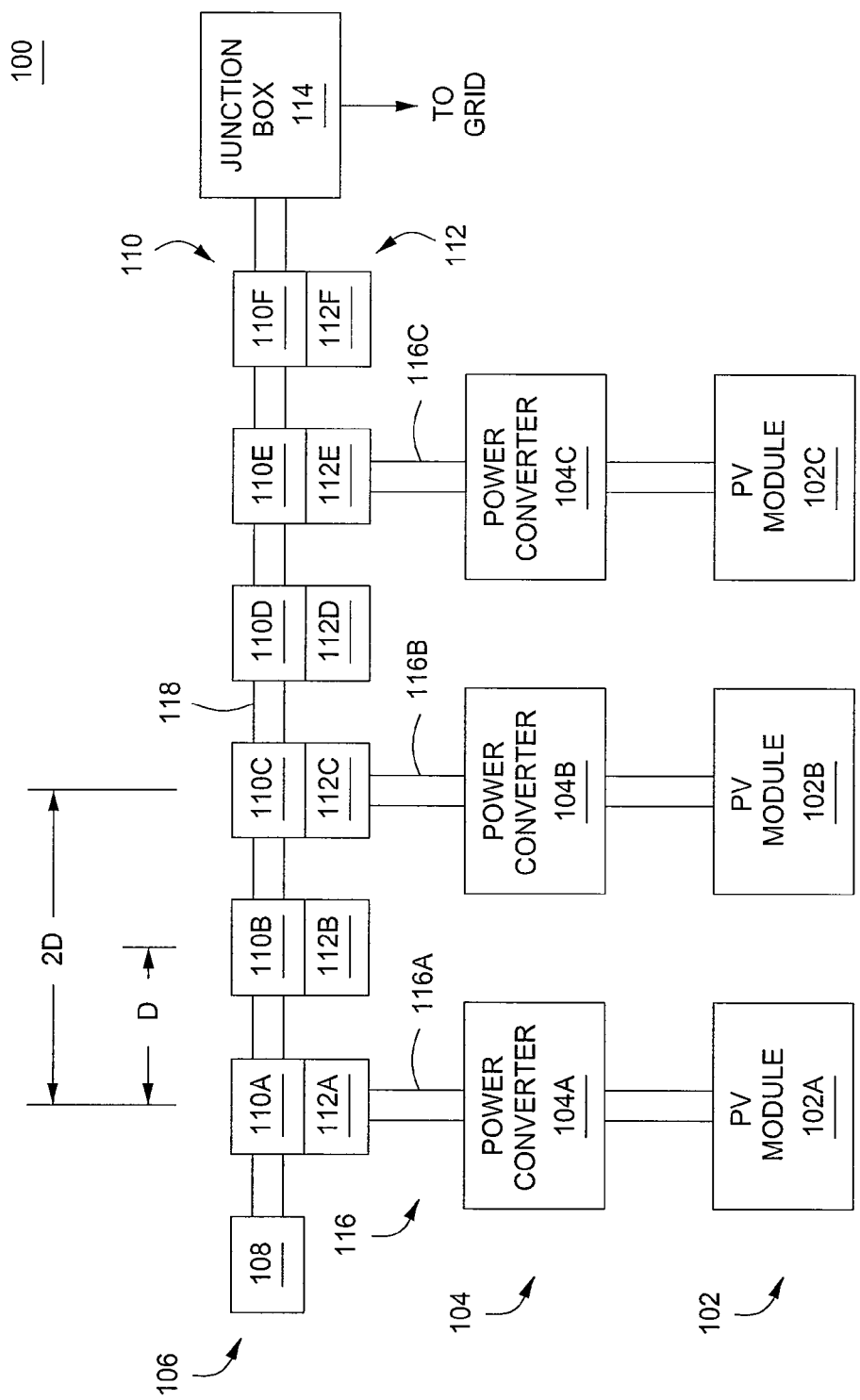
FIG. 1 depicts a block diagram of a photovoltaic energy system in accordance with one or more embodiments of the present invention.

FIG. 1 depicts a block diagram of a photovoltaic energy system 100 in accordance with one or more embodiments of the present invention. The system 100 comprises a plurality of photovoltaic (PV) modules 102A, 102B, 102C (collectively referred to as PV modules 102), a plurality of power converters 104A, 104B, 104C (collectively referred to as power converters 104), a wiring system 106, and a junction box 114. In one embodiment of the invention, each of the PV modules 102 is coupled to an individual power converter 104. In other embodiments, a PV module 102 may be coupled to a plurality of power converters 104, a plurality of PV modules 102 may be coupled to a single power converter 104, or a plurality of portions of PV modules 102 may each be coupled to a power converter 104. In one embodiment, the power converters 104 are DC-AC inverters and the wiring system 106 carries AC power to the junction box 114 and, ultimately, to the AC grid. In other embodiments, the power converters 104 may be DC-DC converters and the wiring system 106 may carry DC energy to a DC-AC inverter at the junction box 114 (e.g., a plurality of DC-DC boosters coupled to a centralized DC-AC inverter via a wiring system similar to the present disclosure). In general, embodiments of the invention interconnect a plurality of distributed power sources (e.g., a power converter in association with a PV module).

The wiring system 106 comprises a cable 118 (trunk cable), a plurality of splice boxes 110A-F (collectively referred to as splice boxes 110) and a termination block 108.

Each of the power converters 104 are coupled to a splice box 110 via a drop connector 112 and a drop cable 116.

In the depicted embodiment, there are more splice boxes 110 than there are power converters 104. In some embodiments, each splice box 110 is coupled to a drop connector 112 and a drop cable 116 to an inverter. In other embodiments, the drop connectors 112B, 112D, and 112F may be in the form of a cap (for more details see the plug cover of FIG. 9 and FIG. 13 below) on the connector pins (plug) of the splice boxes 110B, 110D, and 110F, respectively. The spacing D between splice boxes 110 is generally one half the distance between the centers of horizontally aligned PV modules 102. In such an embodiment, every other splice box 110 is connected to a power converter 104. Such an arrangement is described with reference to FIG. 2. In an alternative embodiment where the PV modules 102 are vertically aligned, every splice box 110 is connected to a power converter 104.

The wiring system 106 comprises a termination block 108 at the distal end of the cable 118. The proximal end of the cable 118 is coupled to the junction box 114. The junction box 114 couples the proximal end of the cable 118 to the power grid. A detailed description of an embodiment of the termination block 108 is described with respect to FIG. 10, and a detailed description of an embodiment of the junction box is described with respect to FIG. 11.

The wiring system 106 can be prefabricated with the cable 118 and splice boxes 110 prior to assembly of the photovoltaic system 100 in the field. The length of the wiring system 106 can be cut before installation of the system in the field or the length can be easily cut from a cable spool in the field. Once the cable 118 is cut to the length of a row of PV modules 102, the cable 118 can be physically attached to the PV module 102, attached to a strut forming a support for the PV modules 102 or laid inside a strut forming a support for the PV modules 102. In some embodiments, sequential numbering may be printed on the splice boxes 110 (i.e., one number per box) so that, once the required number of splice boxes 110 are determined, a user may easily identify the required length of the cable 118.

Figure 2:
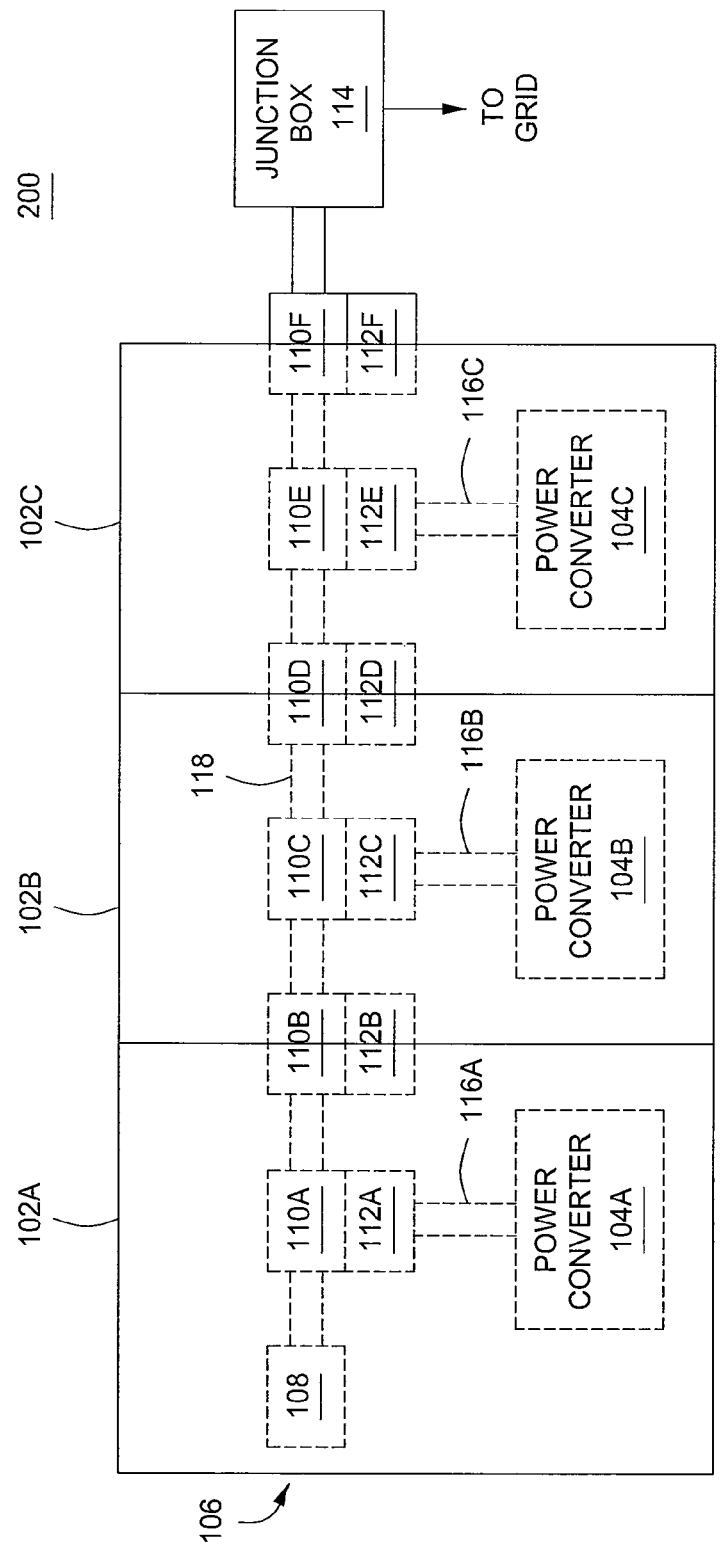
FIG. 2 is a block diagram of a PV module installation comprising the AC wiring system in accordance with one or more embodiments of the present invention.

In one embodiment of the invention, the splice boxes 110 are attached to the trunk cable 118 and the assembly is rolled onto a cable spool. The splice boxes 110 are positioned along the cable 118 at intervals required for utilization with a photovoltaic module array. A conventional PV module has the dimensions of 0.8 m width and a height 1.6 m. In one embodiment, the spacing of the splice boxes 110 is 0.75 m. Using this slice box spacing enables a standard cable 118 to be used when PV modules 102 are mounted in the array horizontally or vertically. When mounted horizontally (as shown in FIG. 2), every other splice box 110 is coupled to a power converter 104. When mounted vertically, every splice box 110 is coupled to a power converter 104. Thus, a single cable system format can be used in a PV system having any orientation of PV module 102. Once the PV modules 102 are mounted, the wiring system 106 need only be cut to the proper length, capped at the distal end, connected to the junction box 114 at the proximal end, and the drop connectors 112 connected to the appropriate splice boxes 110. Consequently, the speed at which a photovoltaic system can be installed is substantially enhanced.

FIG. 2 is a block diagram of a PV module installation 200 comprising the wiring system 106 in accordance with one or more embodiments of the present invention. The PV modules 102A, 102B, and 102C are horizontally installed end-to-end. The splice boxes 110 are coupled to the trunk cable 118 and each spaced a distance D apart, where D is approximately one-half of the horizontal distance across a PV module 102. At one end, the trunk cable 118 terminates in the termination block 108; at the other end, the trunk cable 118 terminates in the junction box 114.

The splice boxes 110A, 110C, and 110E are coupled to the rear faces of the PV modules 102A, 102B, and 102C, respectively, proximate to the horizontal center of each PV module 102. The splice boxes 110A, 110C, and 110E are further coupled to power converters 104A, 104B, and 104C, respectively, via drop connectors and drop cables 112A/116A, 112B/116C, and 112C/116E, respectively. The power converters 104A, 104B, and 104C are coupled to the rear face of the PV modules 102A, 102B, and 102C, respectively, The splice boxes 110B, 110D, and 110F are unused and are terminated by the drop connectors, or plug covers, 112B, 112D, and 112F, respectively.

Figure 3:
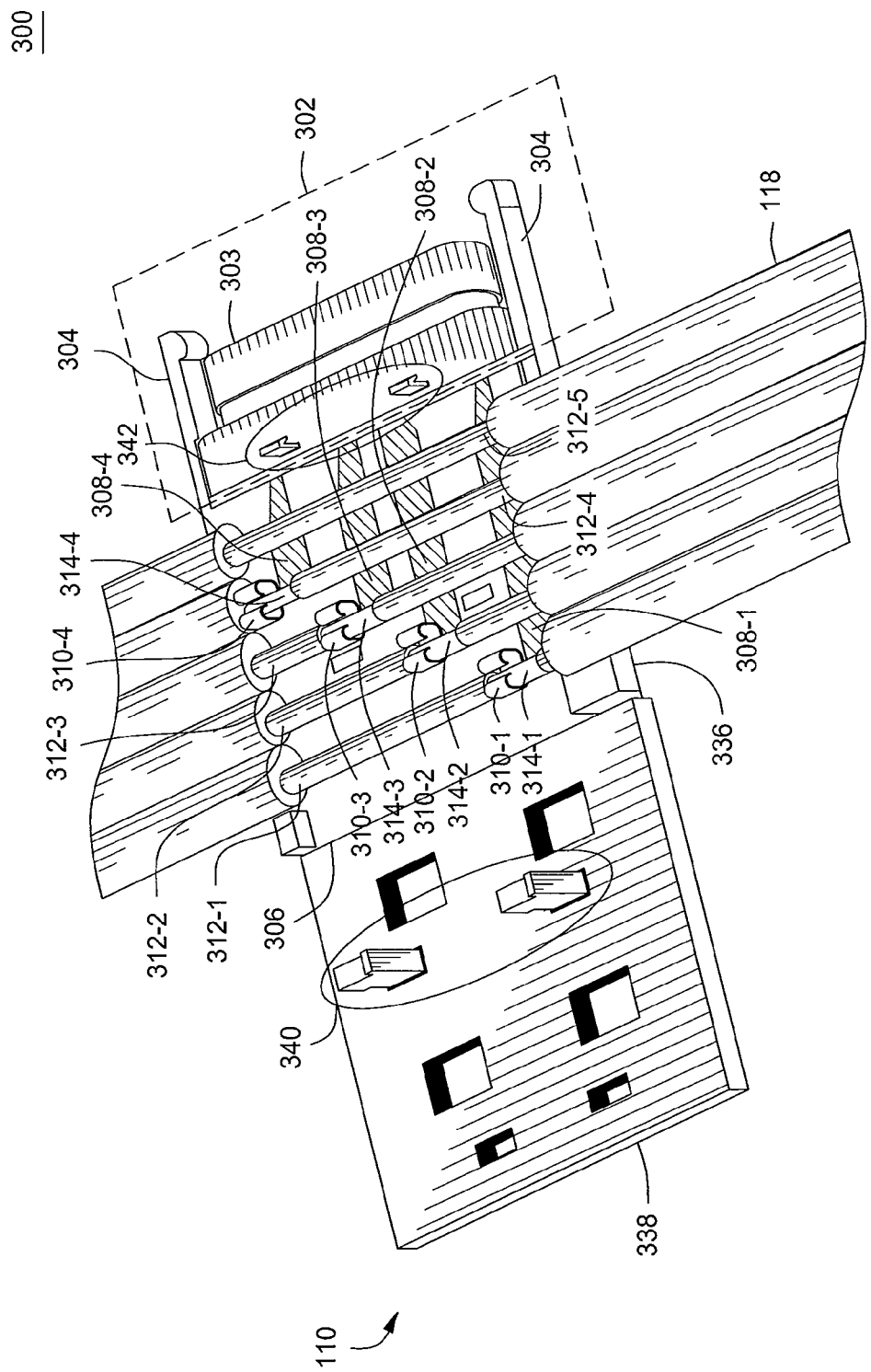
FIG. 3 depicts a detailed perspective view of a splice box in accordance with one or more embodiments of the present invention.

FIG. 3 depicts a detailed perspective view of a splice box 110 in accordance with one or more embodiments of the present invention. The cable 118 is a flat cable having five fully arranged wires 312-1, 312-2, 312-3, 312-4, and 312-5, collectively referred to as wires 312; in other embodiments, the cable 118 may comprise four fully arranged wires 312. Each wire 312 comprises a wire conductor 314 surrounded by an individual insulator, and a cable insulator circumscribes the wire insulators. In one embodiment, the wires 312 are 12 American Wire Gauge (AWG) having a current rating of, for example, 20 amps and 600 V. In a four wire embodiment, the wires 312 are used for ground, neutral, and two AC phases. In a five wire embodiment, the wires 312 are used for ground, neutral, and three AC phases; alternatively, as depicted in FIG. 3, four of the five wires 312 may be used for ground, neutral, and two AC phase connections, while one wire 312-5 remains unused. In other embodiments where the power converters 104 are DC-DC converters and the wiring system 106 carries DC energy, the cable 118 comprises two wires 312.

The splice box 110 shown in FIG. 3 utilizes a five wire cable 118 where one wire 312 remains unspliced (i.e., unused). The splice box 110 is fabricated of injection-molded plastic forming a connector 302 and a splice region 306. The connector 302 comprises mechanical plug latches 304 on each horizontal end of the connector 302 for mechanically coupling to the drop connector 112. In other embodiments, the connector 302 may comprise fewer or more plug latches 304 and/or utilize other mechanisms for coupling to the drop connector 112.

Inserted into the plastic connector 302 are pins (i.e., plug pins 506 described below with respect to FIG. 5) that form a plug portion of the connector 302 (i.e., plug 303). The pins are electrically coupled to splice box conductors 308-1, 308-2, 308-3, and 308-4 that are ultimately coupled to crimp connectors 310-1, 310-2, 310-3, and 310-4, respectively, within the splice region 306 of the splice box 110. During assembly, the wire conductors 314-1, 314-2, 314-3, and 314-4 within the cable 118 are exposed using mechanical or laser stripping to remove a portion of cable and wire insulation. In the embodiment shown in FIG. 3, the splice box 110 is installed from beneath the cable 118 and the crimp connectors 310-1, 310-2, 310-3, and 310-4 are aligned with the exposed wire conductors 314-1, 314-2, 314-3, and 314-4, respectively. The crimp connectors 310-1, 310-2, 310-3, and 310-4 are crimped around the exposed wire conductors 314-1, 314-2, 314-3, and 314-4, respectively, to form an electrical contact—one pin to one wire conductor 314.

The top portion of the splice box 110 (i.e., a housing cover 338) is folded over the bottom portion of the splice box 110 (i.e., a housing base 336) to enclose the connections. Mechanical latches retain the housing cover 338 to the housing base 336 to enclose the splice region. In some embodiments, such as the embodiment depicted in FIG. 3, the housing cover 338 comprises a pair of housing latches 340 disposed perpendicular to the interior of the housing cover 338 and a pair of housing latches 342 disposed perpendicular to the top of the connector 302. When the housing cover 338 is folded over the housing base 336, the housing latches 340 and 342 interlock through corresponding holes in the housing base 336 and the housing cover 338, respectively, to secure the housing cover 338 to the housing base 336.

In an alternative embodiment, in lieu of stripping the cable 118 and wires 312 to facilitate use of crimp connectors 310, the cable insulation may be removed and piercing connectors may be used to pierce the wire insulation to create an electrical connection to the cable wire conductors 314. In another alternative embodiment, the pierce connectors may be used to pierce the cable insulator and the wire insulator and make an electrical connection to the wire conductors 314.

In one embodiment, when using three-phase power, the arrangement of crimp/pierce connectors to pins may be rotated by one phase in each splice box 110 along the cable 118. Such an implementation of phase rotation is described in detail in commonly assigned U.S. Pat. No. 7,855,473, entitled "Apparatus for Phase Rotation for a Three-Phase AC Circuit", issued Dec. 21, 2010, which is incorporated herein by reference in its entirety.

Figure 4:
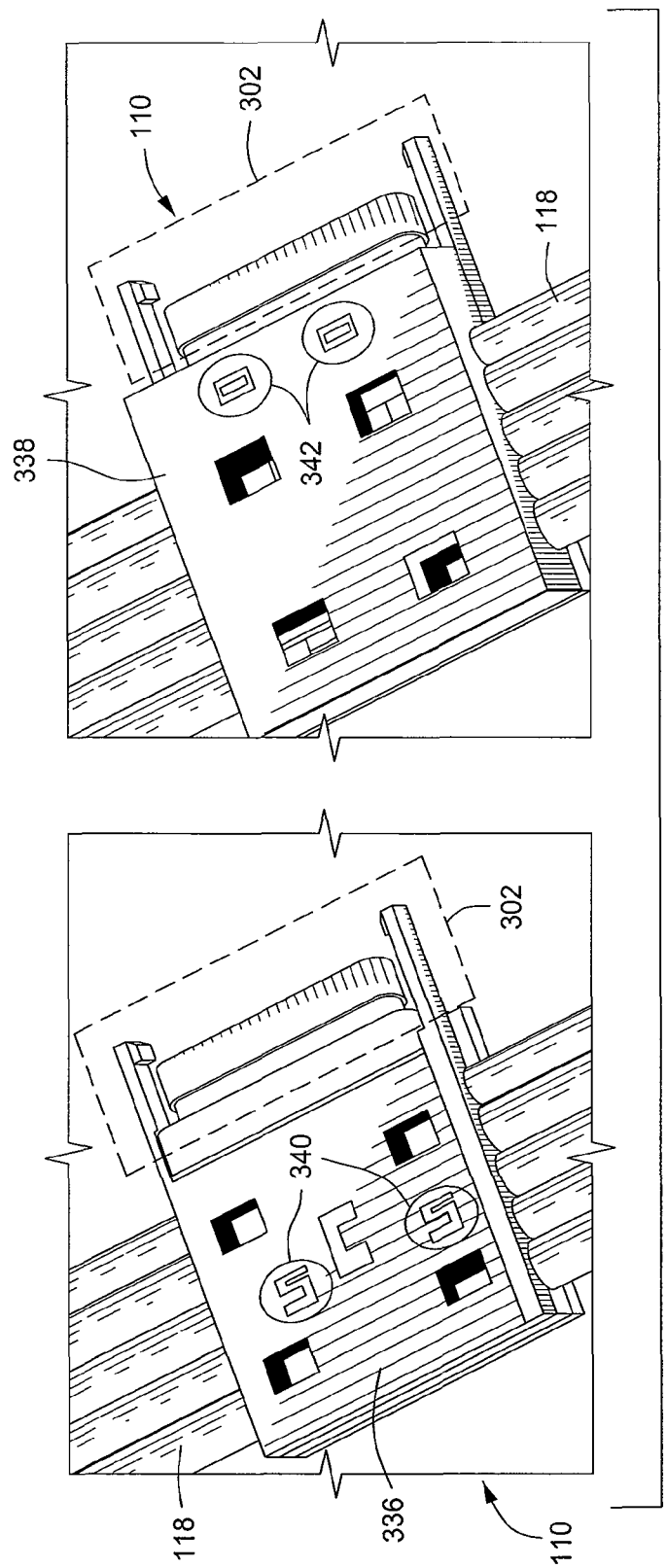
FIG. 4 depicts the splice box having the housing cover closed upon the housing base in accordance with one or more embodiments of the present invention.

FIG. 4 depicts the splice box 110 having the housing cover 338 closed upon the housing base 336 in accordance with one or more embodiments of the present invention. Thereafter, an over mold (e.g., over mold 502 described below with respect to FIG. 5) is applied to the splice box 110 to protect the electrical connections from the environment.

Figure 5:
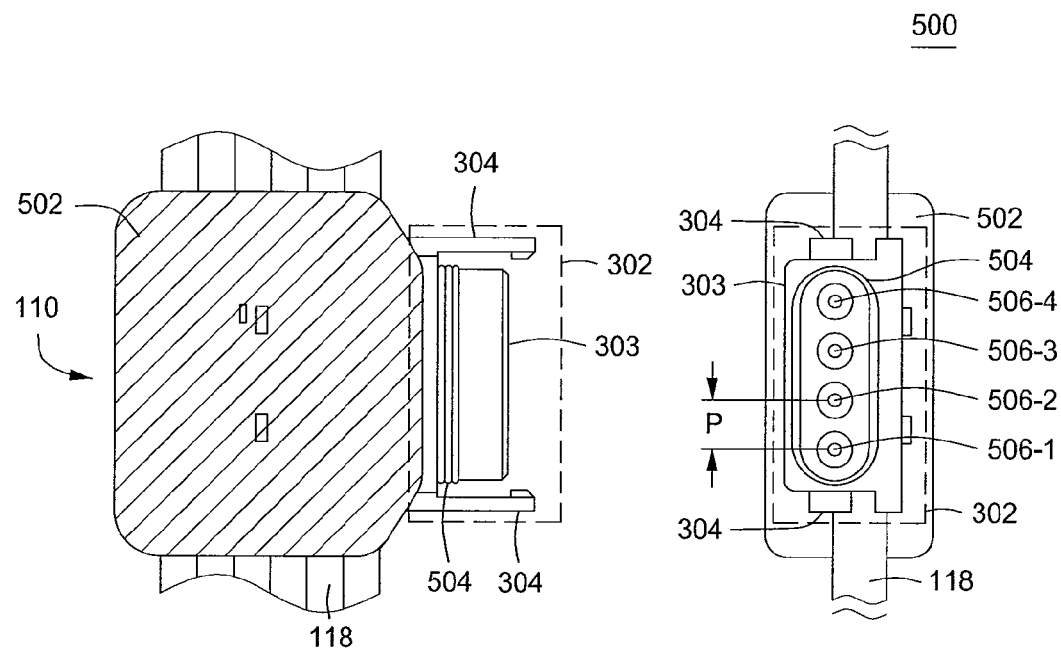
FIG. 5 depicts a top perspective view of the splice box and a head-on perspective view of the splice box plug in accordance with one or more embodiments of the present invention.

FIG. 5 depicts a top perspective view of the splice box 110 and a head-on perspective view of the splice box plug 303 in accordance with one or more embodiments of the present invention. The over mold 502 is applied to cover the mated housing base 336/housing cover 338 such that the connector 302 protrudes from the over mold 502. An O-ring 504 is positioned about the plug 303 of the splice box 110 to provide an environment seal when the splice box 110 is mated with the drop connector 112.

The plug 303 comprises four plug pins 506-1, 506-2, 506-3, and 506-4, collectively referred to as plug pins 506, which are electrically coupled to the cable wire conductors 314-1, 314-2, 314-3, and 314-4, respectively. In some other embodiments, the plug 303 comprises five pins 506 that are electrically coupled to five cable wire conductors 314. Each plug pin 506 has a pitch P with respect to the adjacent plug pin 506; in one embodiment, the plug pins 506 have a pitch of 8.5 millimeters (mm). In some embodiments, one of the plug pins 506 may be longer than the remaining plug pins 506 to enable a make-first-break-last connection.

Figure 6:
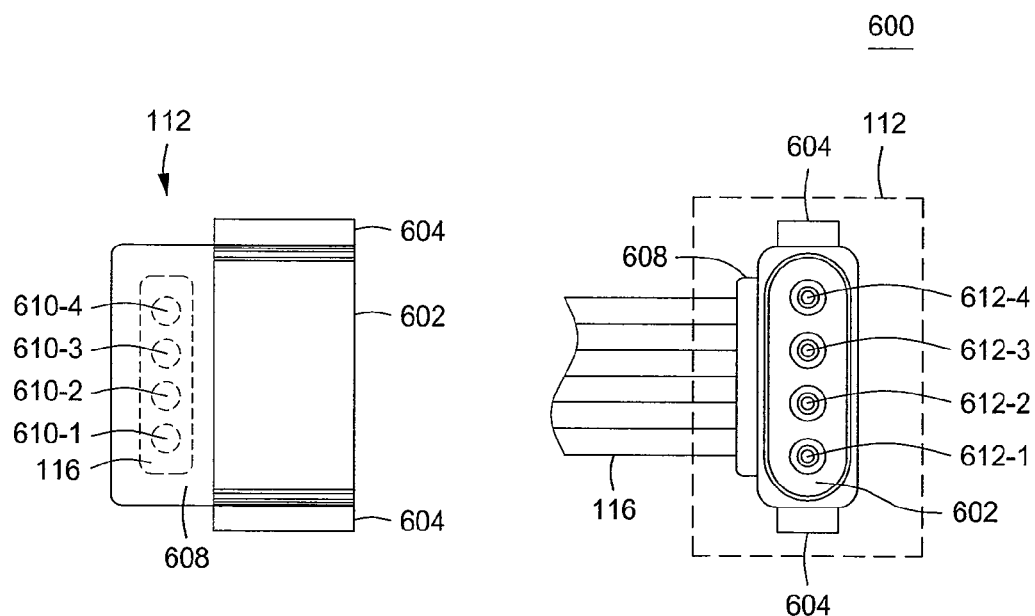
FIG. 6 depicts a top perspective view and a head-on perspective view of the drop connector in accordance with one or more embodiments of the present invention.

FIG. 6 depicts a top perspective view and a head-on perspective view of the drop connector 112 in accordance with one or more embodiments of the present invention. The physical shape of the drop connector 112 is designed to couple with the splice box connector 110 and form an environmentally sound connection.

The drop connector 112 comprises a socket 602 having socket latches 604 disposed on each horizontal end. The socket latches 604 are of a size and shape to mate with the plug latches 304 of the connector 302. The drop connector 112 further comprises a splice hub 608 where drop cable conductors 610-1, 610-2, 610-3, and 610-4 (i.e., conductive elements, such as wire conductors, within the drop cable 116) are electrically coupled to plug pin receptacles 612-1, 612-2, 612-3, and 612-4, respectively, of the socket 602. The plug pin receptacles 612 are of a size and shape to mate with the plug pins 506 of the connector 302, thereby electrically coupling corresponding conductors within the trunk cable 118 and the drop cable 116. In some embodiments, the drop connector 112 comprises four plug pin receptacles 612 (e.g., for coupling to ground, neutral, and two AC phases); alternatively, the drop connector 112 comprises five plug pin receptacles 612 (e.g., for coupling to ground, neutral, and three AC phases).

Figure 7:
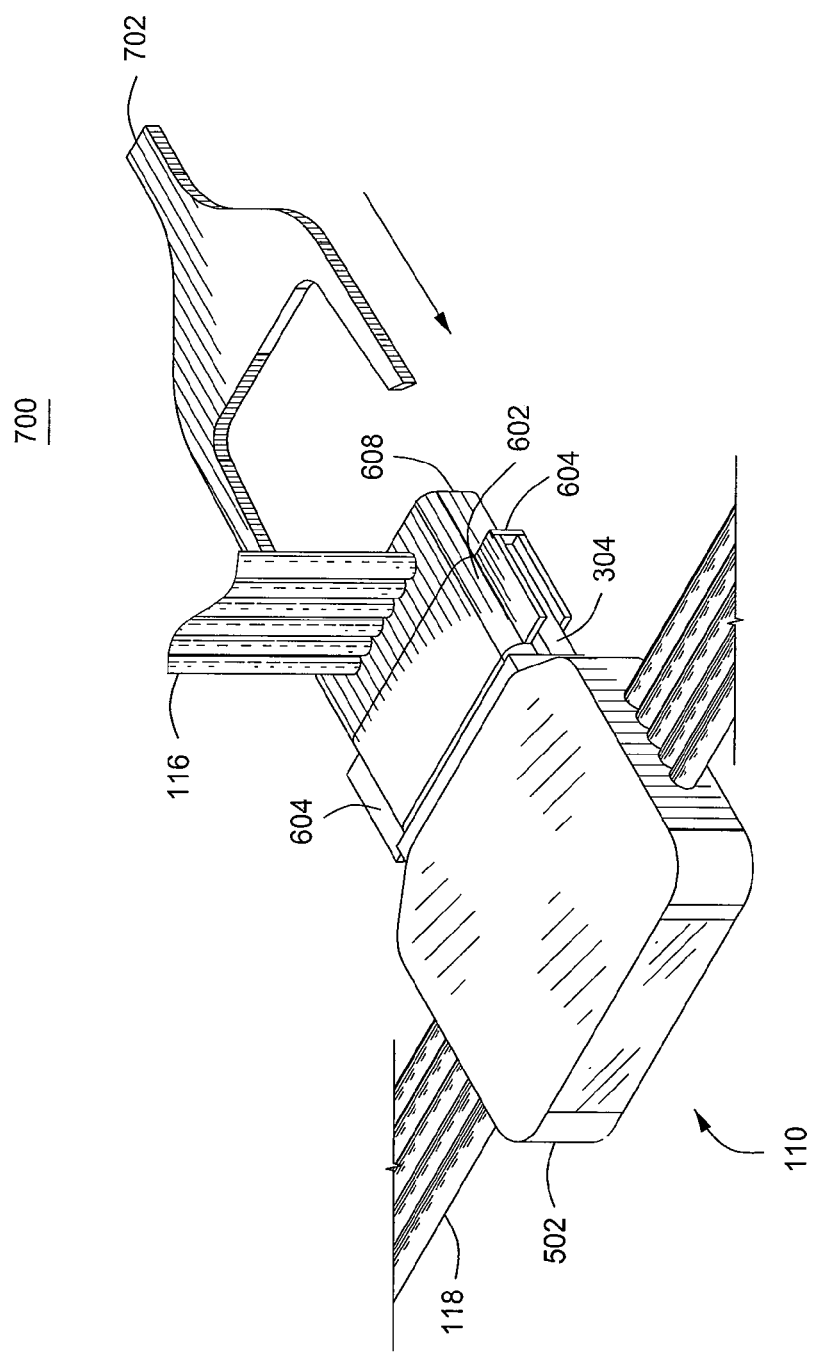
FIG. 7 depicts a perspective view of the drop connector attached to the splice box in accordance with one or more embodiments of the present invention.

FIG. 7 depicts a perspective view of the drop connector 112 attached to the splice box 110 in accordance with one or more embodiments of the present invention. The plug latches 304 and socket latches 604 are mated to secure the drop connector 112 to the splice box 110. In some embodiments, one of the plug latches 304 and a single corresponding socket latch 604 may be sized differently with respect to the remaining plug latch 304/socket latch 604 to facilitate proper alignment of the drop connector 112 with respect to the splice box 110; additionally or alternatively, one of the plug latches 304 and the corresponding socket latch 604 may be shaped and/or oriented differently with respect to the other plug latch 304/socket latch 604 to facilitate alignment.

An extraction tool 702 is used to separate the drop connector 112 from the splice box 110. In some embodiments, the tool 702 is in the shape of a two-pronged fork, where each prong suitably shaped to be inserted along the edges of the drop connector 112 to disengage the connector plug latches 304 from the socket latches 604 on each side of the connector assembly. Once the tool 702 disengages the latches 304 and 604, the drop connector 112 can be pulled away from the splice box 110. In other embodiments, the tool 702 may have a different shape but provide the same functionality for disengaging the drop connector 112 from the splice box 110.

FIG. 8 depicts a side and front perspective view of a splice box 110, a drop connector 112 and a drop cable 116 in accordance with one or more embodiments of the present invention. In this embodiment, the splice box 110 is shown as being attached to the PV module 102. The splice box 110, in other embodiments, may be coupled to the structural support for the PV module 102 as well as positioned within a strut of the structural support. Also in this embodiment, the power converter 104 is shown as being attached to the PV module 102. In other embodiments, the inverter 102 may be coupled to structural support for the PV module 102, to a strut of the structural support, or in another location proximate the PV module 102.

Figure 9:
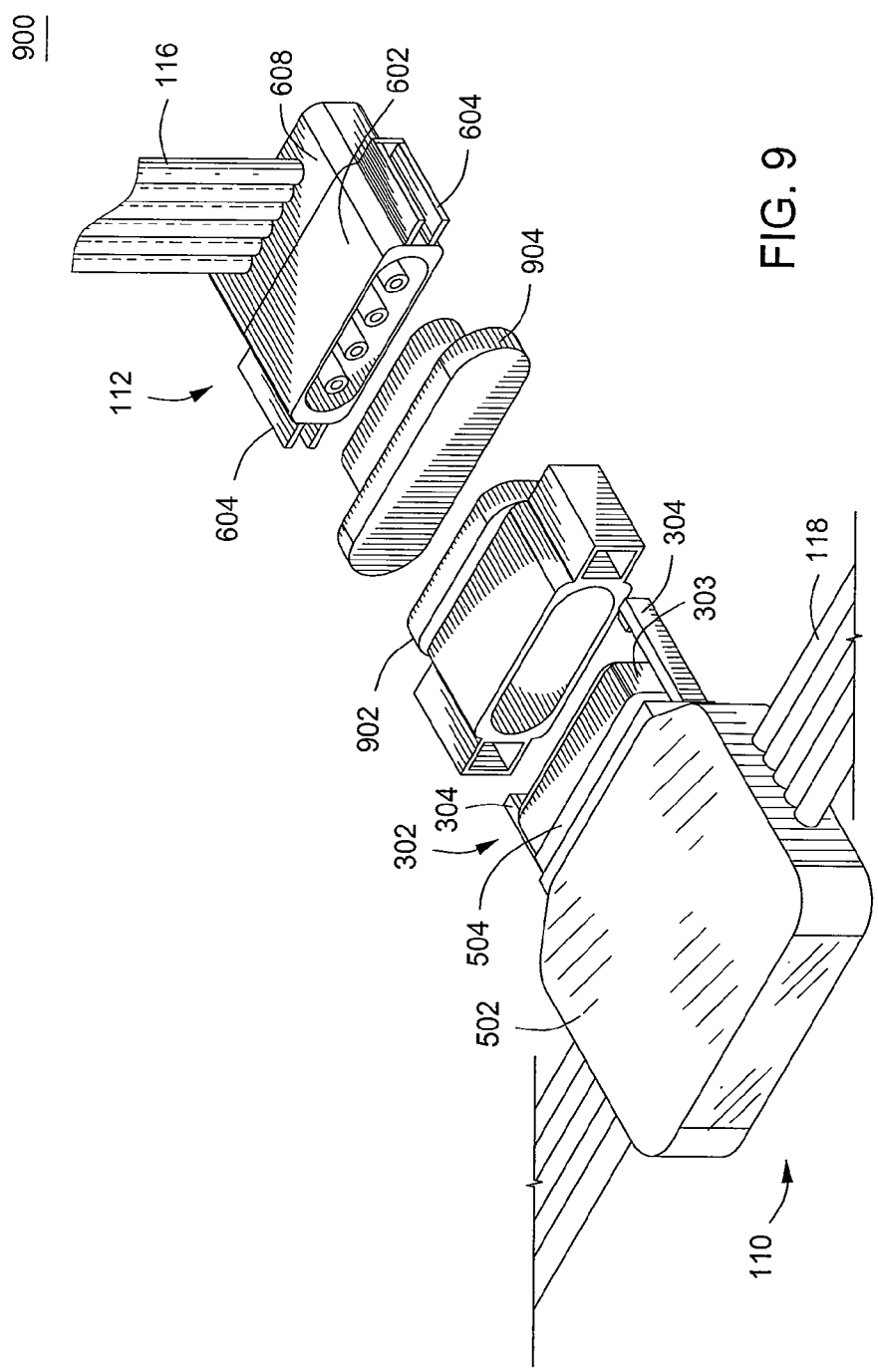
FIG. 9 depicts an exploded, perspective view of the splice box in combination with a protective plug cover and a drop connector socket in combination with a socket cover in accordance with one or more embodiments of the present invention.

FIG. 9 depicts an exploded, perspective view of the splice box 110 in combination with a protective plug cover 902 (i.e., drop connectors 112B, 112D, and 112E) and a drop connector socket 602 in combination with a socket cover 904 in accordance with one or more embodiments of the present invention. The plug cover 902 (or "cap") is of a size and shape to mate with the splice box connector 302 and provide an environmental seal for the plug 303. The plug cover 902 is coupled to the splice box connector 302 in the same manner that the drop connector 112 is coupled to the splice box connector 302. The plug cover 902 is utilized within the wiring system 106 to protect the plug pins 506 of any splice box 110 not being used and/or not coupled to a drop connector 112. The extraction tool 702 may be used to disengage the plug latches 304 from the plug cover 902 to remove the plug cover 902 from the splice box 110.

Analogous to the plug cover 902, the socket cover 904 is of a size and shape to mate with the drop connector 112 and provide an environmental seal for the socket 602. The socket cover 904 protects the socket plug pin receptacles 612 of a drop connector 112 when the socket 602 is not coupled to a splice box connector 302. In some embodiments, the socket cover 904 may "snap fit" tightly to the socket 602 and not require the use of a tool to remove the socket cover 904 from the drop connector 112. Alternatively, the socket cover 904 may comprise latches analogous to the plus latches 304 for coupling to the socket latches 604; in such embodiments, a tool such as the extraction tool 702 may be used to remove the socket cover 904 from the socket 602.

In some embodiments, the plug cover 902 and the socket cover 904 may be fabricated of injection-molded plastic.

Figure 10:
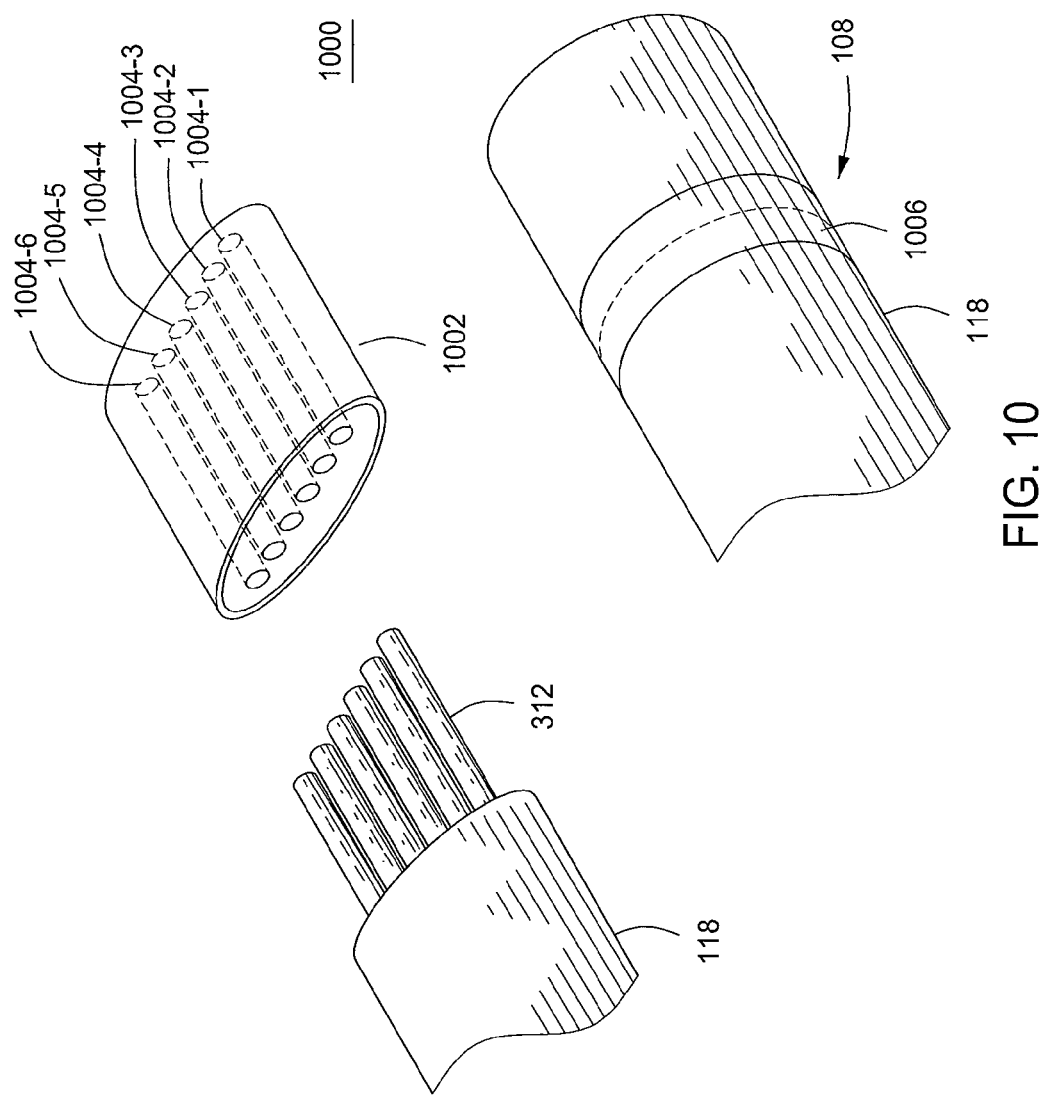
FIG. 10 depicts a termination block used to terminate the distal end of the trunk cable within the wiring system in accordance with one or more embodiments of the present invention.

FIG. 10 depicts a termination block 108 used to terminate the distal end of the trunk cable 118 within the wiring system 106 in accordance with one or more embodiments of the present invention. The termination block 108 is formed by stripping the cable insulator away from the individual wire insulators along an end portion of the cable 118. A cap 1002 having a plurality of apertures 1004-1, 1004-2, 1004-3, 1004-4, and 1004-5 (collectively referred to as apertures 1004) extending partway into the cap 1002 is attached to the end of the cable 118. The apertures 1004 have a pitch equal to the pitch of the wires 312 within the cable 118. Each wire 312 is inserted into an aperture 1004. The cap 1002 is then coupled to the cable 118 using shrink tube, wire tie, and/or other means of attaching the cap 1002 to the cable 118 using an environmentally protective coupling 1006. In one embodiment, to further improve the environmental protection (protect the cable end from moisture ingress) the wires 312 and/or the cap 1002 may be coated with grease.

In some embodiments, the cap 1002 may have five apertures 1004; in other embodiments, the cap 1002 may have four apertures 1004. The number of apertures 1004 may exceed the number of wires 312 and one or more apertures 1004 may thus remain empty when the cap 1002 is couples to the cable 118.

Figure 11:
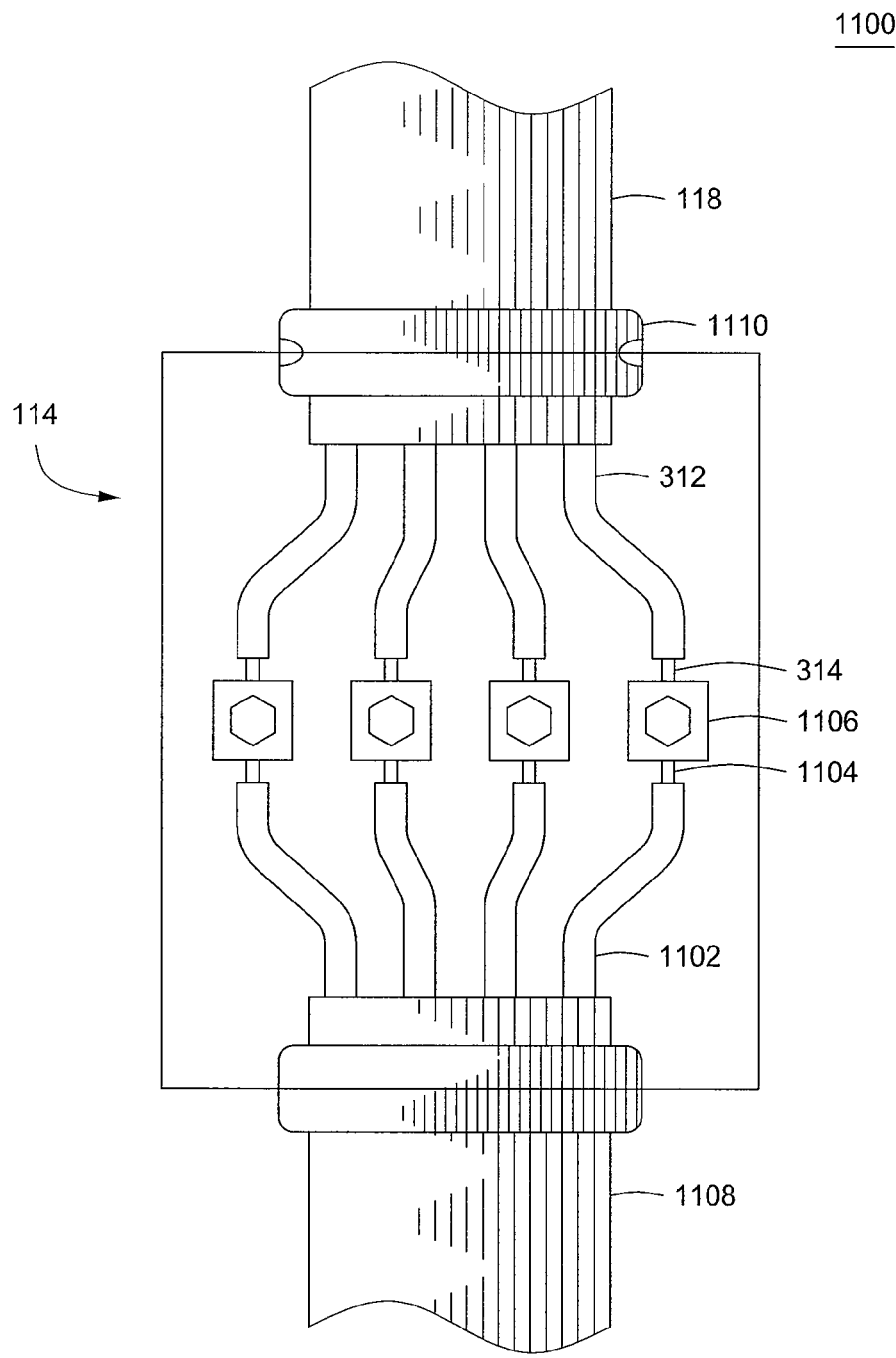
FIG. 11 depicts a top view of one embodiment of the junction box for coupling the AC wiring system to the power grid in accordance with one or more embodiments of the present invention.

FIG. 11 depicts a top view of one embodiment of the junction box 114 for coupling the wiring system 106 to the power grid in accordance with one or more embodiments of the present invention. The junction box 114 provides an environmentally protected connection between the cable wires 312 of the wiring system 106 and conduit wires 1102 that connect to the AC power grid. The proximal end of the cable 118 extends through feedthrough 1110 in the side of the junction box 114. The insulation of the cable 118 is stripped to expose the cable wires 312. The insulation at the ends of the cable wires 312 is stripped to expose the wire conductors 314. Similarly, the insulation from the ends of each conduit wire 1102 is stripped to expose conduit wire conductors 1104. The conductors 314 and 1104 exposed at the stripped ends of the wires 312 and 1102, respectively, are electrically connected to one another using twist-on wire connectors 1106 (i.e., one twist-on wire connector for each cable wire/conduit wire) or some other means for connecting the wire conductors to one another. In this manner, the AC power generated by the power converters 104 and PV modules 102 is coupled to the power grid. A cover (not shown) is placed over the junction box 114 to protect the exposed wires from the environment.

Figure 12:
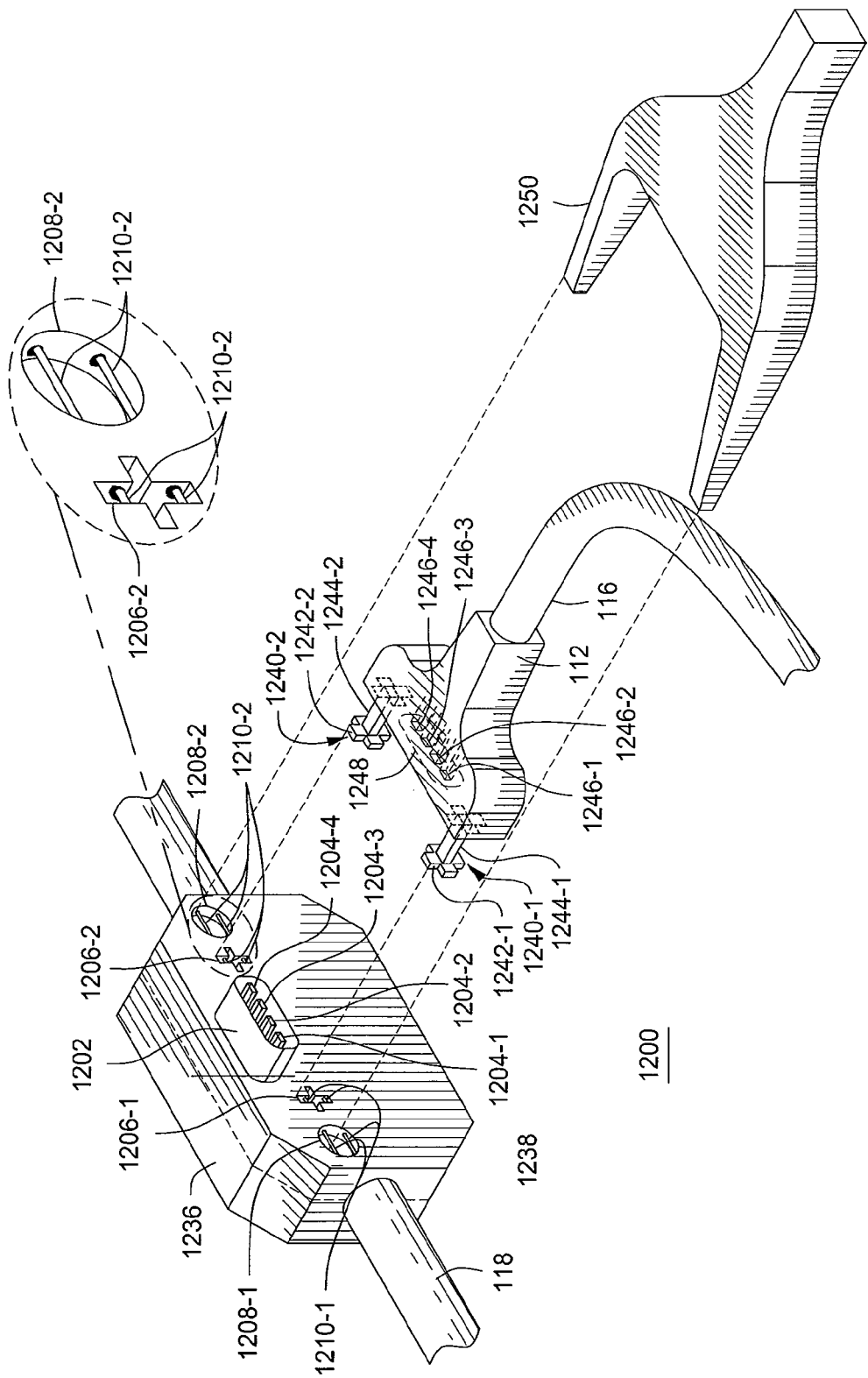
FIG. 12 depicts an exploded, perspective view of a splice box and a drop connector in accordance with one or more alternative embodiments of the present invention.

FIG. 12 depicts an exploded, perspective view of a splice box 110 and a drop connector 112 in accordance with one or more alternative embodiments of the present invention. The splice box 110 is substantially rectangular in shape and comprises a housing base 1236 and a housing cover 1238 that are mated around the trunk cable 118 (i.e., the trunk cable 118 "passes through" through splice box 110) to protect electrical connections within the body of the splice box 110. In some embodiments, such as the embodiment depicted in FIG. 12, the trunk cable 118 may be substantially round in shape rather than flat and may comprise four or five wires, as previously described. In other embodiments, the trunk cable 118 may be a flat cable as previously described.

The splice box 110 comprises a plug 1202 projecting from the housing cover 1238 between a pair of guide pin receptacles 1206-1 and 1206-2 collectively referred to as guide pin receptacles 1206. The guide pin receptacles 1206-1 and 1206-2 are located between a pair of release apertures 1208-1 and 1208-2, collectively referred to as release apertures 1208, although in other embodiments the release apertures 1208 may be between the guide pin receptacles 1206. The plug 1202 may be part of the form factor of the housing cover 1238, and the housing cover 1238, plug 1202, and housing base 1236 may be formed of injection-molded plastic.

The plug 1202 surrounds plug pins 1204-1, 1204-2, 1204-3, and 1204-4, collectively referred to as plug pins 1204, which extend through the housing cover 1238; in some embodiments, the plug pins 1204 may have a pitch of 8.5 mm. The plug pins 1204 are formed of a conductive material and, within the splice box 110, are coupled to wire conductors 314 of the cable 118 in a one-to-one correspondence. In some embodiments, the wire conductors 314 may be exposed during assembly, for example using mechanical or laser stripping to remove a portion of cable and wire insulation, and coupled to the plug pins 1204. Each wire conductor 314 is identified as corresponding to neutral, ground, or a specific AC phase, and is electrically coupled to an individual plug pin 1204 in a one-to-one correspondence. The wire conductors 314 and plug pins 1204 may be electrically coupled via soldering, crimping, or a similar technique. In some other embodiments, the cable insulation may be removed and piercing connectors may be used to pierce the wire insulation to create an electrical connection between the plug pins 1204 and the wire conductors 314. In certain embodiments using three-phase power, the arrangement of crimp/pierce connectors to plug pins 1204 may be rotated by one phase in each splice box 110 along the cable 118 (i.e., a phase rotation technique may be used).

In some embodiments, each plug pin 1204 extending outward from the housing base 1236 may be isolated from the other plug pins 1204 within the plug 1202 by divider walls that are part of the plug form factor. Additionally or alternatively, one of the plug pins 1204 may extend further outward from the housing base 1236 than the remaining plug pins 1204 to enable a make-first-break-last connection.

The guide pin receptacles 1206 and release apertures 1208 are horizontally aligned with respect to the plug 1202. The release apertures 1208 are generally circular in shape and extend through the width of the splice box 110. The guide pin receptacles 1206 are of a size and shape to mate with drop connector guide pins 1240, described further below. Generally, one of the guide pin receptacles 1206, e.g., guide pin receptacle 1206-1, may be sized differently with respect to the remaining guide pin receptacle 1206, e.g., guide pin receptacle 1206-2, to facilitate proper alignment of the drop connector 112 with respect to the splice box 110; in some embodiments, such alignment may be facilitated by one of the guide pin receptacles 1206 being shaped and/or oriented differently than the other guide pin receptacle 1206.

A pair of retention bars 1210-1 extend horizontally through the guide pin receptacle 1206-1 and the adjacent release aperture 1208-1, and a pair of retention bars 1210-2 extend horizontally through the guide pin receptacle 1206-2 and the adjacent release aperture 1208-2. The retention bars 1210 retain the drop connector 112 and are positioned such that they may be pressed apart from one another and subsequently return to their original position; for example, the retention bars 1210 may be one or more of legs of a flexible U-shaped element disposed within the splice box 110, held in position by spring mechanisms, or any element for providing the functionality described below for retaining the drop connector or the plug cover 1302 as described further below.

The drop connector 112 comprises a socket 1248 and guide pins 1240-1 and 1240-2, collectively referred to as guide pins 1240. The guide pins 1240 are disposed on each horizontal side of the socket 1248. The guide pins 1240-1 and 1240-2 comprise shafts 1244-1 and 1244-2, respectively, which terminate in protuberances 1240-1 and 1240-2, respectively, and are of a size and shape to mate with the guide pin receptacles 1206-1 and 1206-2, respectively. In some embodiments, the guide pins 1240 may have a cross-shaped cross section.

The drop connector 112 further comprises plug pin receptacles 1246-1, 1246-2, 1246-3, and 1246-4, collectively referred to as plug pin receptacles 1246, disposed within the socket 1248. Within the drop connector 112, each of the plug pin receptacles 1246 is electrically coupled to a different conductive element within the drop cable 116 (e.g., ground, neutral, and two AC phase wires). In some other embodiments, the drop connector 112 may comprise five plug pin receptacles 1246 for coupling to five wires within the drop cable 116 (e.g., ground, neutral, and three AC phases). The plug pin receptacles 1246 are of a size and shape to mate with the plug pins 1204 of the splice box 110, thereby electrically coupling corresponding conductors within the trunk cable 118 and the drop cable 116.

When the drop connector 112 is coupled to the splice box 110, the guide pins 1240 are inserted into the guide pin receptacles 1206. The retention bars 1210 within the guide pin receptacles 1206 are forced apart as the protuberances 1242 pass between the retention bars 1210. The retention bars 1210 then close around the guide pin shafts 1244, locking the drop connector 112 to the splice box 110. Additionally, the socket 1248 may snap-fit to the plug 1202 to further secure the drop connector 112 to the splice box 110. In some embodiments, an O-ring may be present around the plug 1202 to provide an environmental seal between the drop connector 112 and the splice box 110.

In order to disengage the drop connector 112 from the splice box 110, an extraction tool 1250 may be used. In some embodiments, the extraction tool 1250 may be in the shape of a two-pronged fork with tapered prongs. To release the drop connector 112 from the splice box 110, the prongs are inserted into the release apertures 1208 to spread apart the retention bars 1210 so that the guide pin protuberances 1242 may pass between the retention bars 1210. The drop connector 112 can then be pulled away from the splice box 110. In other embodiments, the extraction tool 702 may have a different shape but provide the same functionality for disengaging the drop connector 112 from the splice box 110.

Figure 13:
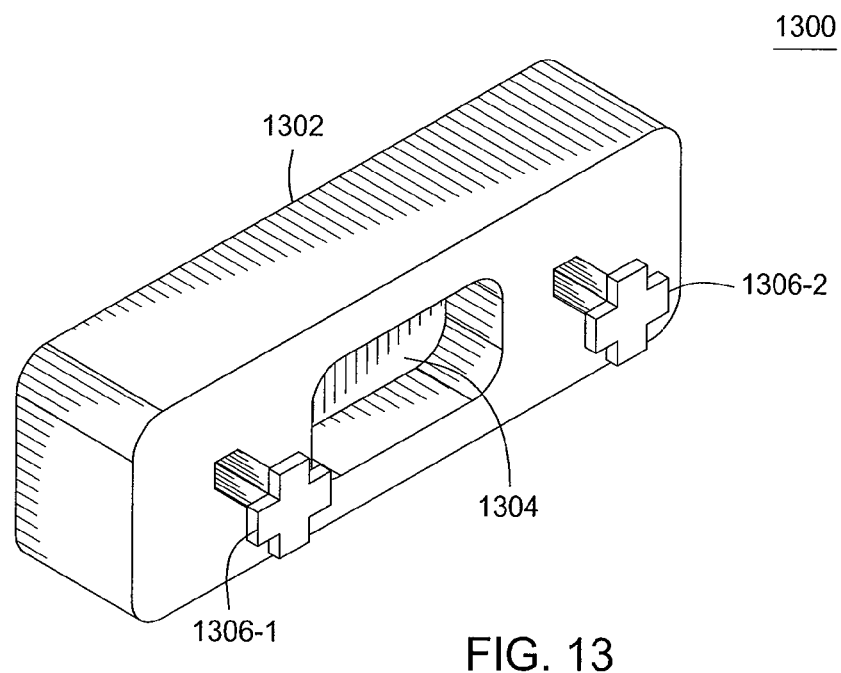
FIG. 13 depicts a plug cover in accordance with one or more alternative embodiments of the present invention.

FIG. 13 depicts a plug cover 1302 in accordance with one or more alternative embodiments of the present invention. The plug cover 1302 comprises a plug receptacle 1304 and cover guide pins 1306-1 and 1306-2. The plug cover 1302 is of a size and shape to mate with the splice box 110 and provide an environmental seal for the plug 1202. The plug cover 1302 is coupled to the splice box 110 in the same manner that the drop connector 112 is coupled to the splice box 110 and is utilized to protect the plug pins 1204 of any splice box 110 not being used and/or not coupled to a drop connector 112. The extraction tool 1250 or a similar tool may be used to disengage the plug cover 1302 from the splice box 110 by inserting the extraction tool prongs into the release apertures 1208 and pulling the plug cover 1302 from the splice box 110. In some embodiments, the plug receptacle 1304 may "snap fit" tightly to the plug 1202 to secure the plug cover 1302 to the splice box 110. In some such embodiments, the cover guide pins 1306 may not be required and the plug cover 1302 may be disengaged from the splice box 110 merely by pulling the plug cover 1302 from the splice box 110.

Figure 14:
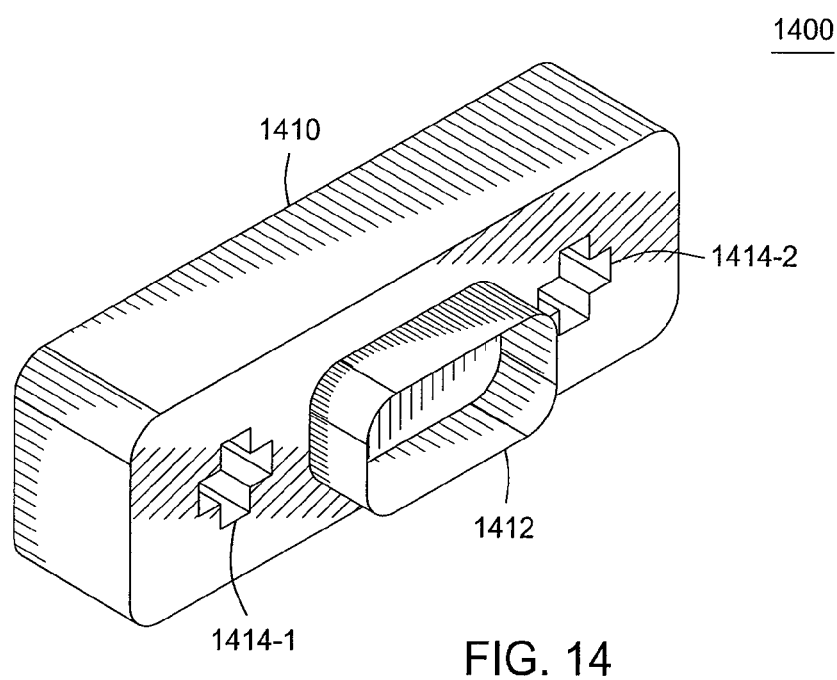
FIG. 14 depicts a socket cover in accordance with one or more alternative embodiments of the present invention.

In some embodiments, the plug cover 1302 may be fabricated of injection-molded plastic FIG. 14 depicts a socket cover 1410 in accordance with one or more alternative embodiments of the present invention. The socket cover 1410 comprises a dummy plug 1412 and guide pin receptacles 1414-2 and 1414-2. The socket cover 1410 is of a size and shape to mate with the drop connector 112 and provide an environmental seal for the socket 602. The socket cover 1410 protects the socket 1248 of a drop connector 112 when not coupled to a splice box 110. In some embodiments, the plug receptacle 1304 may snap-fit to the socket 1248 to secure the plug cover to the drop connector 112. Additionally or alternatively, the plug cover 1302 may comprise release apertures and retention bars analogous to the splice box release apertures 1208 and retention bars 1210, respectively, for securing the socket cover 1410 to the drop connector 112. In such embodiments, the extraction tool 1250 or a similar tool may be used to disengage the socket cover 1410 from the drop connector 112.

In some embodiments, the socket cover 1410 may be fabricated of injection-molded plastic.

Figure 15:
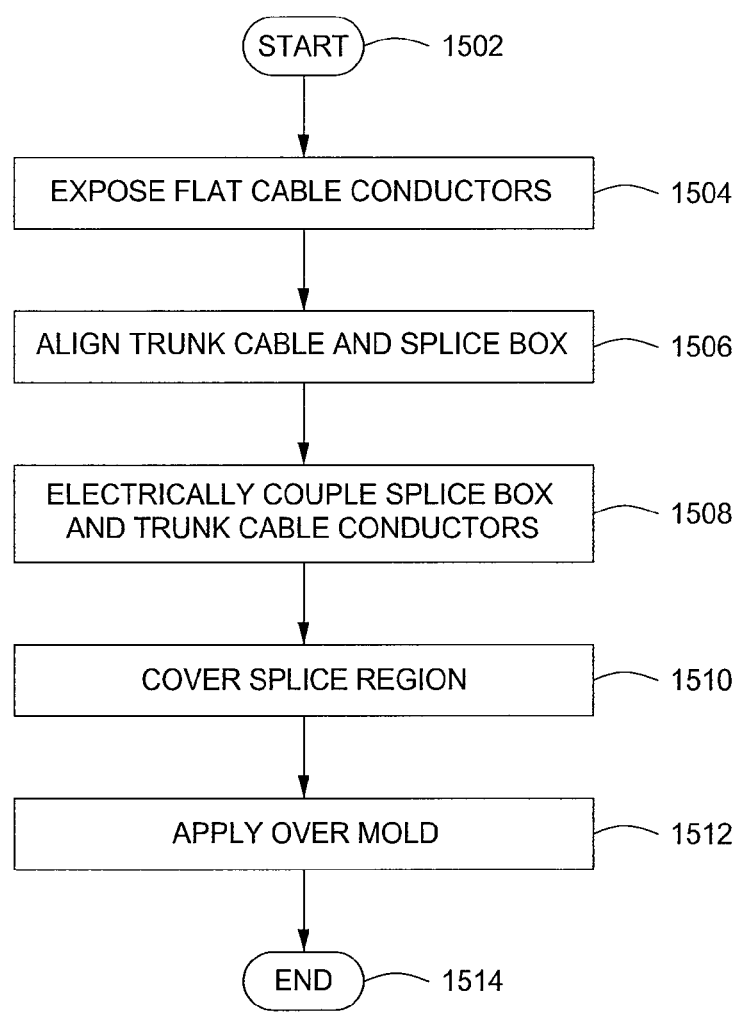
FIG. 15 is a block diagram of a method for generating an AC wiring system assembly in accordance with one or more embodiments of the present invention.

FIG. 15 is a block diagram of a method 1500 for generating a wiring system assembly in accordance with one or more embodiments of the present invention. The wiring system assembly comprises a trunk cable coupled to a splice box. The trunk cable is a flat trunk cable, such as the trunk cable 118 depicted in FIG. 3, and may be coupled to a splice box 110 as depicted in FIG. 3; alternatively, the splice box may be as depicted in FIG. 12. The splice box comprises a plug, such as plug 303 or plug 1202, for coupling the splice box to a drop connector, such as the drop connector 112.

The method 1500 starts at step 1502 and proceeds to step 1504. At step 1504, wire conductors within the flat trunk cable are exposed. Mechanical or laser stripping may be used to remove a portion of cable insulation and wire insulation to expose the wire conductors (e.g., wire conductors 314). Each wire conductor is exposed such that it can be aligned with a splice box conductor (e.g., splice box conductors 308) which it is electrically coupled to a particular pin of the plug pin (e.g., plug pin 506). Thus, the arrangement of exposed wire conductors to splice box conductors determines which wire of the flat cable is electrically coupled to which pin of the splice box plug.

In some embodiments, the trunk cable may comprise four wires and all four wire conductors are exposed for coupling to the splice box conductors; in other embodiments, the trunk cable may comprise five wires and four or five wire conductors are exposed.

The method 1500 proceeds to step 1504, where the exposed portion of the trunk cable is aligned with the splice region of the splice box. As previously described with respect to FIG. 3, the splice box splice region comprises a plurality of splice box conductors, each splice box conductor coupled to a pin of a splice box connector in a one-to-one correspondence. In some embodiments, the splice box may comprise four conductors coupled to four plug pins in a one-to-one correspondence; in other embodiments, the splice box may comprise five conductors coupled to five plug pins in a one-to-one correspondence. The trunk cable is aligned with the splice box splice region such that the exposed wire conductors are aligned with the splice box conductors corresponding to the desired pins—i.e., each exposed wire conductor is aligned with a splice box conductor such that the wire conductor will be electrically coupled to a particular splice box plug pin. In one embodiment using three-phase power, the arrangement of wire conductors to splice box plug pins may be rotated by one phase in each splice box along the cable (i.e., phase rotation may be utilized).

The method 1500 proceeds to step 1508 where the splice box conductors are electrically coupled to the wire conductors. In some embodiments, the splice box conductors may terminate in crimp connectors (i.e., one crimp connector per splice box conductor) for coupling to the exposed wire conductors; such a technique for coupling the cable and splice box conductors allows a defective splice box to be easily replaced on a trunk cable. In other embodiments, other techniques for coupling the cable and splice box conductors may be used, such as soldering.

In certain embodiments, in lieu of stripping the trunk cable and wires, the trunk cable insulation may be removed and piercing connectors may be used to pierce the wire insulation to create an electrical connection to the trunk cable wire conductors; alternatively, the pierce connectors may be used to pierce the cable insulator and the wire insulator and make an electrical connection to the wire conductors. In one embodiment using three-phase power, the arrangement of crimp/pierce connectors to splice box plug pins may be rotated by one phase in each splice box along the cable (i.e., phase rotation may be utilized).

The method 1500 proceeds to step 1510 where the splice region is covered by a housing cover. In some embodiments the housing cover may be part of the form factor of the splice box and can be folded over the splice region to mechanically couple to a splice box housing base, covering the splice region. In other embodiments, the housing cover may be a separate piece that is fit over the splice region and coupled to the splice box housing base to cover the splice region. The housing cover may be secured to the housing base by one or more mechanical latches, clips, or a similar technique.

The method 1500 proceeds to step 1512. At step 1512, an over mold, such as the over mold 502, is applied over the mated splice box housing cover/housing base. The over mold protects the electrical connections within the splice region from the environment.

The method 1500 then proceeds to step 1514 where it ends.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. A cable assembly for delivering power from a plurality of solar inverters to an alternating current (AC) grid, the cable assembly comprising:
   a first end to deliver the power from the plurality of solar inverters to the AC grid;
   a first cable connector located at a distal end of the cable assembly opposite the first end, the first cable connector configured to plug with and unplug from an inverter output connector of a first solar inverter of the plurality of solar inverters;
   a plurality of continuous conductors electrically connected to the first end and the first cable connector; and
   at least one second cable connector electrically coupled to the plurality of continuous conductors via a tap connection located between the first end and the first cable connector such that the continuous wire conductors are unbroken at the tap connection,
   the second cable connector configured to plug with and unplug from an inverter output connector of a second solar inverter of the plurality of solar inverters.

2. The cable assembly of claim 1, wherein the first end delivers combined power from the plurality of solar inverters.

3. The cable assembly of claim 1, wherein the plurality of wire conductors further comprises a neutral wire, first AC wire, and second AC wire.

4. The cable assembly of claim 1, wherein the plurality of wire conductors further comprises a neutral wire, first AC wire, second AC wire, and third AC wire.

5. A system for delivering power to an AC grid, the system comprising:
   a first inverter having a first inverter connector and being configured to deliver inverter AC power via the first inverter connector;
   a second inverter having a second inverter connector and being configured to deliver inverter AC power via the second inverter connector; and
   a cable assembly configured to receive power from the first and second inverters, the cable assembly comprising:
   a first end for delivering the power from the first inverter and the second inverter;
   a first cable connector located at a distal end of the cable assembly opposite the first end, the first cable connector separably mated with the first inverter connector to receive the inverter AC power from the first inverter,
   the first cable connector separable from the first inverter connector to disconnect the first inverter from the cable assembly,
   a plurality of continuous conductors electrically connected to the first end of the cable assembly and the first cable connector, and
   at least one second cable connector electrically coupled to the plurality of continuous conductors via associated tap connections between the first end of the cable assembly and the first cable connector such that the continuous conductors are unbroken at the tap connections,
   the second cable connector separably mated with the second inverter connector to receive the inverter AC power from the second inverter and deliver the inverter AC power from the second inverter to the plurality of continuous conductors,
   the second cable connector separable from the second inverter connector to disconnect the second inverter from the cable assembly.

6. A cable assembly for delivering power from a plurality of inverters to an alternating current AC grid, the cable assembly comprising:
   a first end to deliver the power from the plurality of inverters to the AC grid;
   a first cable connector located at an end of the cable assembly opposite the first end, the first cable connector configured to insert with and disengage from an output cable connector of a first inverter of the plurality of inverters;
   a plurality of continuous pass through wire conductors electrically connected to the first end and the first cable connector,
   a second cable connector electrically coupled to the plurality of continuous pass through wire conductors via a tap connection located between the first end and the first cable connector such that the continuous pass through wire conductors are unbroken at the tap connection, the second cable connector configured to insert with and disengage from an output connector of a second inverter of the plurality of inverters.

* * * * *